United States Patent
Fezer et al.

(10) Patent No.: US 10,980,246 B2
(45) Date of Patent: Apr. 20, 2021

(54) COOKING-AID FOR COATING AND FRYING A FOOD PRODUCT AND METHOD FOR MAKING SAID COOKING-AID

(71) Applicant: NESTEC S.A., Vevey (CH)

(72) Inventors: Ramona Jasmin Fezer, Singen (DE); Christoph Hanle, Singen (DE); Sanyasi Gaddipati, Singen (DE); Dirk Jacobus Maritz, Singen (DE)

(73) Assignee: Societe des Produits Nestle S.A., Vevey (CH)

( * ) Notice: Subject to any disclaimer, the term of this patent is extended or adjusted under 35 U.S.C. 154(b) by 93 days.

(21) Appl. No.: 15/778,532

(22) PCT Filed: Nov. 15, 2016

(86) PCT No.: PCT/EP2016/077700
§ 371 (c)(1),
(2) Date: May 23, 2018

(87) PCT Pub. No.: WO2017/089174
PCT Pub. Date: Jun. 1, 2017

(65) Prior Publication Data
US 2018/0343883 A1    Dec. 6, 2018

(30) Foreign Application Priority Data

Nov. 26, 2015  (EP) .................... 15196502

(51) Int. Cl.
| | | |
|---|---|---|
| A23D 7/005 | (2006.01) |
| A23P 20/10 | (2016.01) |
| A23L 5/10 | (2016.01) |
| A23L 13/00 | (2016.01) |
| A23L 13/40 | (2016.01) |
| A23L 19/18 | (2016.01) |
| A23L 29/219 | (2016.01) |
| A23L 29/212 | (2016.01) |
| A23L 19/00 | (2016.01) |
| A23D 7/02 | (2006.01) |

(52) U.S. Cl.
CPC ............ *A23D 7/0053* (2013.01); *A23D 7/02* (2013.01); *A23L 5/12* (2016.08); *A23L 13/03* (2016.08); *A23L 13/43* (2016.08); *A23L 19/00* (2016.08); *A23L 19/18* (2016.08); *A23L 29/212* (2016.08); *A23L 29/219* (2016.08); *A23P 20/11* (2016.08); *A23V 2002/00* (2013.01)

(58) Field of Classification Search
CPC .......... A23D 7/0053; A23D 7/02; A23L 5/12; A23L 13/03; A23L 13/43; A23L 19/00; A23P 20/11
USPC ......................... 426/552, 553, 302
See application file for complete search history.

(56) References Cited

U.S. PATENT DOCUMENTS

| | | | | |
|---|---|---|---|---|
| 4,375,484 A | * | 3/1983 | Lee .......... | A23P 20/12 426/293 |
| 4,504,509 A | * | 3/1985 | Bell .......... | A23P 20/12 426/302 |
| 2003/0033939 A1 | | 2/2003 | Mahe et al. | |
| 2010/0119659 A1 | * | 5/2010 | Ovadia ........ | A23L 13/06 426/92 |

FOREIGN PATENT DOCUMENTS

| | | |
|---|---|---|
| EP | 0375239 | 6/1990 |
| JP | 2005160312 | 6/2005 |

* cited by examiner

*Primary Examiner* — Hamid R Badr
(74) *Attorney, Agent, or Firm* — K&L Gates LLP

(57) ABSTRACT

The present invention relates to a shelf-stable cooking-aid for coating and flying a food product in one step for example in a heating pan, the cooking aid comprising 3-28 wt % oil, 20-60 wt % water, 2.3-5.5 wt % modified starch, 3-15 wt % salt, 0.5-30 wt % sugar and 0.5-30 wt % flavorings and wherein the cooking aid has a viscosity in the range of 8 to 60 Pa·s at a shear rate of $1s^{-1}$ at 25° C., and the oil and water are in form of an emulsion. Further aspects of the invention are the method for making said cooking-aid as well as a method for coating and flying a food product in a heated pan or heated surface.

12 Claims, No Drawings

COOKING-AID FOR COATING AND FRYING A FOOD PRODUCT AND METHOD FOR MAKING SAID COOKING-AID

CROSS REFERENCE TO RELATED APPLICATIONS

The present application is a National Stage of International Application No. PCT/EP2016/077700, filed on Nov. 15, 2016, which claims priority to European Patent Application No. 15196502.7, filed on Nov. 26, 2015, the entire contents of which are being incorporated herein by reference.

The present invention relates to a shelf-stable cooking-aid for coating and frying a food product in one step for example in a heating pan. Further aspects of the invention are the method for making said cooking-aid as well as a method for coating and frying a food product in a heated pan or on a heated surface.

It is well known to fry meat and/or vegetable in oil. There are also products on the market using a combination of different oils to achieve a beneficial effect regarding juiciness of meat, oil splattering and/or aroma release.

Documents on cooking aids and food preparation compositions such as U.S. Pat. No. 6,403,144 describe food preparation compositions comprising an anti-stick agent, a flavour enhancing agent and an anti-foaming agent that can be used to prepare food, yet provide improved flavour, texture and aroma. WO 04/016090 describes a coating fat composition for producing a fry-like food without frying in oil. The fat composition is obtained by adding to a fat an agent capable of lowering the contact angle measured at ordinary temperature. However, these documents all fail to disclose a method for coating a food product at a same time as frying it. Hence, such final cooked foods do not have a coating after the frying.

Hence, the identified prior art describes an oil compositions for frying but not coating a food product. There appears to be no prior art which describes the key benefit of an all-in-one cooking aid which combines coating and frying in one single step, which is easy and convenient to handle by a consumer, e.g. in his home kitchen, and which delivers a coated pan-fried product.

Hence, there is a persisting need in the art and food industry to provide a better solution for a consumer for directly coating and frying a food product e.g. in his or her kitchen, the solution being more convenient for use than the solutions presently on the market, and preventing for example not melting and/or unnecessary splattering of oil during the frying step and/or creating of a film formation in the pan and/or burning/smoking without adding additionally oil to the pan.

SUMMARY OF THE INVENTION

The object of the present invention is to improve the state of the art and to provide a more convenient and clean solution for coating and frying a food product for example in a heating pan in preferably only one single manipulation step by a user.

Particularly, the objective is to provide a composition with water and oil in the form of an emulsion: i) melting easily in a heated pan or heated surface; ii) does not splatter; iii) does not make use of an additive such as emulsifier, non-starch polysaccharides, or combinations thereof which may not be favourably perceived by consumers; iv) does not form film/burnings by direct contact with a heated pan; v) is perceived as healthy/natural by the consumers; vi) has a natural appearance to consumer; vii) provides a coating to the ingredients after a pan frying product preparation; viii) can be distributed evenly on the ingredients of the final dish; ix) is discharging easily from the pack x) no additional need to add oil and/or fat to the pan;

The object of the present invention is achieved by the subject matter of the independent claims. The dependent claims further develop the idea of the present invention.

Accordingly, the present invention provides in a first aspect a shelf-stable cooking aid for coating and frying a food product, the cooking aid comprising:
  i) oil in an amount of 2-28% (by weight of the total composition);
  ii) water in an amount of 20-60% (by weight of the total composition);
  iii) modified starch in an amount of 2.3-5.5% (by weight of the total composition);
  iv) salt in an amount of 3-15% (by weight of the total composition);
  v) sugar in an amount of 0.5-30% (by weight of the total composition);
  vi) flavourings in an amount of 0.5-30% (by weight of the total composition;
  and wherein the cooking aid has a viscosity in the range of 8 to 60 Pa·s at a shear rate of 1 s$^{-1}$ at 25° C. and the oil and water are in the form of an emulsion.

In a second aspect, the invention relates to a process for making the shelf-stable cooking aid of the present invention, comprising the steps of:
  a) Mixing ingredients which are not heat sensitive and/or need a pasteurization step at a mixing speed in a range of 1500-2500 rpm to form an emulsion;
  b) Heating the mix from step a) to a temperature between 70-98° C.;
  c) pasteurizing the mix step b) at a temperature of at least 72° C., at a mixing speed in the range of 100-200 rpm;
  d) optional cooling the mix from step c) to a temperature below 50° C. and further mixing ingredients which are heat sensitive and/or does not need a pasteurization step at a mixing speed in the range of 100-200 rpm;
  e) Filling the resulting cooking aid from step c) or step d) into packaging containers;
wherein the total amount of water from the different method steps adds up to 20-60 wt % of the cooking aid; and wherein the total amount of oil from the different method steps adds up to 2-28 wt % of the cooking aid and wherein the cooking aid has a viscosity in the range of 8 to 60 Pa·s at a shear rate of 1 s$^{-1}$ at 25° C. and wherein the oil and water are in form of an emulsion.

A third aspect of the invention relates to a method for coating and frying a food product in one single step, wherein the cooking aid of the present invention is melted in a heated pan or on a heated surface and the food product is directly fried in the cooking aid of the present invention without the addition of any further fat or oil.

A still further aspect of the invention pertains to a use of the cooking aid of the present invention for coating and frying a food product in one single step, wherein the cooking aid of the present invention is melted in a heated pan or on a heated surface and the food product is directly fried in the cooking aid of the present invention without the addition of any further fat or oil.

It has been surprisingly found by the inventors that when combining an emulsion between water and oil in a very specific ratio with a specific predetermined amount of a modified starch, a composition can be obtained having a viscosity in the range of 8 to 60 Pa·s at a shear rate of $1\ s^{-1}$ at 25° C. This composition well melts upon direct in a heating pan or on a heating surface. In addition it binds to food products and upon direct frying of said food products in a heating pan or on a heating surface provides them with a nice coating. No additional oil or fat has to be added to the food product for frying, as the composition, i.e. the cooking aid of the present invention, already comprises enough oil for that frying step. The fact that the oil is embedded in a pasty emulsion with water and modified starch further substantially reduces oil splattering during the frying process as well no film formation and/or smoking and burning. This is a very simple, single manipulation step for a consumer which is very convenient, clean and provides the consumer with a good satisfactory result of a coated and fried food product.

DETAILED DESCRIPTION OF THE INVENTION

The present invention pertains to a shelf-stable cooking aid for coating and frying a food product, the cooking aid comprising:
 i) oil in an amount of 2-28% (by weight of the total composition);
 ii) water in an amount of 20-60% (by weight of the total composition);
 iii) modified starch in an amount of 2.3-5.5% (by weight of the total composition);
 iv) salt in an amount of 3-15% (by weight of the total composition);
 v) sugar in an amount of 0.5-30% (by weight of the total composition);
 vi) flavourings in an amount of 0.5-30% (by weight of the total composition;
and wherein the cooking aid has a viscosity in the range of 8 to 60 Pa·s at a shear rate of $1\ s^{-1}$ at 25° C. and the oil and water are in the form of an emulsion.

In a preferred embodiment the present invention pertains to a shelf-stable cooking aid for coating and frying a food product, the cooking aid comprising:
 i) oil in an amount of 3-18% (by weight of the total composition);
 ii) water in an amount of 40-58% (by weight of the total composition);
 iii) modified starch in an amount of 3-5% (by weight of the total composition);
 iv) salt in an amount of 3-9% (by weight of the total composition);
 v) sugar in an amount of 3-28% (by weight of the total composition);
 vi) flavourings in an amount of 5-25% (by weight of the total composition;
and wherein the cooking aid has a viscosity in the range of 8 to 60 Pa·s at a shear rate of $1\ s^{-1}$ at 25° C. and the oil and water are in the form of an emulsion.

The shelf-stable cooking aid is suitable for coating and frying a food product for example in a cooking pan, and this preferably in one single manipulation step by the cook or consumer.

By "shelf-stable" is meant that the said cooking aid can be safely stored at room temperature in a sealed pack. Particularly, the cooking aid can be safely stored for at least 6 months, preferably for at least 9 months, more preferably for at least 12 months at a room temperature of 25° C. Within the said shelf-stable period, the cooking aid maintains its organoleptic stability as well as its microbiological safety. During that period the cooking aid remains a paste to serve its described functionality.

In a preferred embodiment of the present invention, the cooking aid comprises oil in an amount of 2-28% (by weight of the total composition), preferably from 3-25%, preferably from 3-20%, preferably from 3-18%, more preferably from 5-18%, even more preferably from 7-15% (by weight of the total composition).

In one embodiment, the oil of the present cooking aid is liquid at a room temperature of 25° C., preferably at a room temperature of 22° C.

In a preferred embodiment, the oil is a vegetable oil. Preferably, the oil is selected from the group consisting of palm oil, palm olein, olive oil, corn oil, sunflower oil, rice bran oil, soybean oil and canola oil, or a combination thereof. The advantage of having a vegetable oil in the cooking aid of the present invention is that such vegetable oils are more healthy and more appreciated by consumers than oils originating from many other origins such as milk fat, beef or pork fat.

The cooking aid of the present invention comprises water (total amount of moisture present) in an amount of 20-60% (by weight of the total composition), preferably from 30-60%, preferably from 35-60%, more preferably from 40-58%, even more preferably 45-58% (by weight of the total composition).

In another preferred embodiment of the present invention, the cooking aid comprises modified starch in an amount of 2.3-5.5% (by weight of the total composition), preferably 2.5-5.5%, more preferably from 3-5%, even more preferably from 3.5-4.5% (by weight of the total composition).

The term "modified starch" refers to a physically modified or chemically modified starch, preferably physically modified starch which is high resistance to heat and shear or combination thereof. The modified starches may be from any source, such as corn, waxy corn, waxy maize, tapioca, corn, wheat, potato and rice and/or combinations thereof, and may be chemically-modified, physically-modified, or combinations thereof. Preferably physically modified starches are heat-moisture treated to improve the stability of the starch granule.

In one embodiment, the modified starch of the present cooking aid is in a gelatinized form. "Gelatinized" means that intermolecular hydrogen bonds of the modified starch molecules were broken down in the presence of water and heat, resulting in the disruption of the granular structure and the loss of birefringence.

Corresponding flours can also be used as a source of starch. Similar to the starches corresponding modified flours can be from the same botanical origin and variety. The person skilled in the art is calculating based on the amount of modified starch how much modified flour has to be used to fall within this invention.

"Salt" refers to any suitable alkali metal salt or mixture thereof. In one embodiment the salt used in the composition is typically, but not limited to sodium chloride. For example, potassium chloride may be used or any low-sodium product having a taste impression of sodium chloride may be used, as long as the taste in the end formulation is acceptable. In a further embodiment, the composition comprises salt in the range 3 to 15% (by weight of the total composition), preferably from 3 to 13%, preferably from 3 to 12%, preferably from 4 to 10%, more preferably from 5 to 7% (by weight of the total composition).

"Sugar" refers to any sweetness given ingredient which are suitable for being used in a food product or food concentrate product. In one embodiment the sugar used in the composition is typically, but not limited to sucrose. Sugar can be any monosaccharide (glucose, fructose, galactose), disaccharide (sucrose, maltose, lactose) or oligosaccharide and/or any artificial sweeteners (*stevia*, aspartame, sucralose, neotame, acesulfame potassium, saccharin, advantame) or any combination thereof. Preferably sugar is honey, white sugar, brown sugar or any combination thereof. In a further embodiment, the composition comprises sugar in the range 0.5 to 30% (by weight of the total composition), preferably 3-25%, more preferably 6-20% (by weight of the total composition)

The cooking aid of the present invention has a viscosity from 8 to 60 Pa·s at a shear rate of is at 25° C., measured by using a modular compact Rheometer (Physica MCR 300; measuring system ST24/1D-2V CC27), at a shear rate of 1 s-1 at 25° C. Preferably, the cooking aid has a viscosity from 8 to 55 Pa·s at a shear rate of is at 25° C., more preferably from 8-50 Pa·s at a shear rate of is at 25° C. Cooking aids with higher viscosities, i.e. a viscosity above 60 Pa·s are not preferred for the cooking aid of the present invention. Cooking aids with lower viscosities than ca. 8 Pa·s are not preferred for the present invention as they are too liquid and not enough pasty anymore.

The viscosity of the free flowable composition has been measured by using a modular compact Rheometer (Physica MCR 300; measuring system ST24/1D-2V CC27), at a shear rate of 1 s-1 at 25° C.

The composition of the cooking aid of the present invention may further comprise a suitable organic acid that can help to improve and prolong the shelf-stability of the cooking aid. It is known in the art that food preservation techniques such as pasteurization, increasing acidity and decreasing variable water can limit the growth of microorganisms in foods.

Examples of suitable organic acids which can be added to the cooking aid of the present invention are citric acid, lactic acid and/or acetic acid. The cooking aid of the present invention has a pH value from 5.0 to 3.0, preferably from 4.8 to 3.5

The water activity of the product is preferably below 0.92, preferably below 0.89, preferably between 0.6 and 0.92, preferably between 0.7 and 0.92, more preferably between 0.75 and 0.92.

The composition of the present cooking aid may also further comprise flavourings. The term "flavourings" in the context of the composition means flavouring agents, taste enhancing ingredients, herbs, spices, vegetables, meat and fish components (in wet or powder form), acidic components, caramel. Taste enhancing ingredients may be provided by monosodium glutamate (MSG), disodium ribonucleotides, vegetable protein hydrolysates or yeast extracts or combination thereof etc. Acidic components may be provided e.g. by citric acid, lemon juice (extracts) or vinegar (extracts) or combination thereof. Flavoring agents can include coriander, ingwer, lemongrass, curcuma, chili, paprika, mustard, garlic, onion, turmeric, tomato, coconut milk, cheese, oregano, thyme, jalapeno pepper, white pepper powder and black pepper in wet or dry format. In a further embodiment, the composition comprises flavourings in an amount in the range of 0.5 to 30% (by weight of the total composition), preferably between 5 to 25%, preferably between 10 to 25% (by weight of the total composition).

In a preferred embodiment, the cooking aid of the present invention does not include any emulsifier, non-starch polysaccharide, or combinations thereof.

The term "non-starch polysaccharides" are selected from the group consisting of xanthan gum, guar gum, locust bean gum, carboxymethyl cellulose, alginate, pectin, agar, carrageenan and gelatin, or a combination thereof. Corresponding flours as a source of starch are not considered as a non-starch polysaccharide.

The term "emulsifier" is selected from the group consisting of egg yolk, lecithin, mustard, soy lecithin, sodium phospates, sodium stearoyl lactylate, diacetyl tartaric ester of monoglyceride (DATEM), polyglycerol-polyricinoleate (PGPR), monoglyceride and mono-diglyceride or a combination thereof.

In a general aspect, the cooking aid of the present invention can be made my mixing all the ingredients together, pasteurizing the mixture and then filling the pasteurized paste into packaging containers.

However, a preferred aspect of the present invention pertains to a process for making the shelf-stable cooking aid of the present invention, comprising the steps of:
a) Mixing all ingredients which are not heat sensitive or need a pasteurization step at mixing speed in a range of 1500-2500 rpm to form an emulsion;
b) Heating the mix from step a) to a temperature of between 70-98° C.;
c) pasteurizing the mix step b) at a temperature of at least 72° C., at mixing speed in the range of 100-200 rpm;
d) optional cooling the mix from step c) to a temperature below 50° C. and further mixing ingredients which are heat sensitive or does not need a pasteurization step at mixing speed in the range of 100-200 rpm;
e) Filling the resulting cooking aid from step c) or step d) into packaging containers;
and wherein the cooking aid has a viscosity in the range of 8 to 60 Pa·s at a shear rate of 1 s$^{-1}$ at 25° C. and the oil and water are in the form of an emulsion.

Still further ingredients selected from the group consisting of organic acids may be added to the mixing in step a) and/or after the pasteurizing step d).

A further aspect of the present invention relates to a method for coating and frying a food product in one single step, wherein the cooking aid of the present invention is melted in a heated pan or on a heated surface and the food product is directly fried in the cooking aid of the present invention without the addition of any further fat or oil.

Preferably, the food product is a meat or a vegetable product or combination thereof.

The term "heated pan or on a heated surface" means that the pan or the surface has a temperature suitable meat and/or vegetable frying. Temperatures between 100-170° C. are preferred.

A still further aspect of the invention pertains to a use of the cooking aid of the present invention for coating and frying a food product in one single step, wherein the cooking aid of the present invention is melted in a heated pan or on a heated surface and the food product is directly fried in the cooking aid of the present invention without the addition of any further fat or oil.

Those skilled in the art will understand that they can freely combine all features of the present invention disclosed herein. In particular, features described for the product of the present invention may be combined with the methods of the present invention and vice versa. Further, features described for different embodiments of the present invention may be combined.

Further advantages and features of the present invention are apparent from the examples.

EXAMPLES

The invention is further described with reference to the following examples. It will be appreciated that the invention as claimed is not intended to be limited in any way by these examples.

Example 1

The general procedure for preparing a shelf-stable cooking aid of the invention is as follows:
  Mixing all ingredients at speed of 2000 rpm to form an emulsion;
  heat the mix to a temperature of at least 70° C. for at least 2 minutes;
  pasteurizing the mix at a temperature of at least 72° C., at mixing speed of 150 rpm for at least 5 minutes;
  fill the composition into containers.

Alternative the general procedure for preparing a shelf-stable cooking aid of the invention is as follows:
  Mixing all ingredients except the flavors and fresh spice pastes in order to prevent flavor and color losses at speed of 2000 rpm to form an emulsion;
  heat the mix to a temperature of at least 85° C. for at least 2 minutes;
  pasteurizing the mix at a temperature of at least 75° C., at mixing speed of 150 rpm for at least 5 minutes;
  cooling down the mix to a temperature of 50° C. or below at mixing speed of 150 rpm;
  Mixing in the flavor and fresh spice pastes at speed of 1000 rpm to avoid lumping;
  fill the composition into containers.

Example 2: Method of Pan Frying

Preheat the pan for 1 min at high heat (above 100° C. temperature of pan);
Add 109 g shelf-stable cooking aid;
Wait 30 sec until sizzling starts;
Add 400 g sliced chicken breast and stir for 5 min at high heat;
Add 500 g sliced vegetables (100 gr spring onions, 200 g bell pepper, 200 g pack choy) and stir for 5 min at high heat;

Examples 3-20

A composition according to the invention was prepared according to the general method as described in Example 1 using the amounts of ingredients in the following table and cooking it as described in example 2 evaluating the below listed attributes. 8 internal experienced panelists were used to rate the functional performance and the final food products of example 3-20.

| Ingredient (% w/w) | Example 3 Reference Amount [%] | Example 4 Amount [%] | Example 5 Amount [%] | Example 6 Amount [%] | Example 7 Amount [%] |
|---|---|---|---|---|---|
| Water | 48 | 48 | 48 | 48 | 48 |
| Salt | 5 | 5 | 5 | 5 | 5 |
| Sugars | 24 | 24 | 24 | 24 | 24 |
| Oil | 10 | 10 | 10 | 10 | 10 |
| Flavoring | 9.2 | 9.2 | 9.2 | 9.2 | 9.2 |
| Starch | 3.8 [1] | 3.8 [2] | 3.8 [3] | 3.8 [4] | 3.8 [5] |
| Viscosity | 19.87 ± 2.72 | 40.72 ± 6.36 | 37.21 ± 6.87 | 22.14 ± 0.74 | 32.22 ± 1.65 |
| Aw | 0.887 | 0.885 | 0.887 | 0.888 | 0.884 |
| pH | 3.8 | 3.81 | 3.82 | 3.81 | 3.82 |
| Melting | Quick, sizzling | −1 (slower as ref) | −1 | 0 | 0 |
| Splattering | no | 0 | 0 | 1 (more as ref) | 0 |
| Film formation | no | 1 (more as ref) | 1 | 0 | 0 |
| Glazing of meat | Sticks to meat-not to pan | −1 (less as ref) | −1 | 0 | 0 |
| Smoking/burning | no | 1 (more as ref) | 1 | 0 | 0 |
| Coating of final dish | Well coated | 0 | 0 | −1 (less as ref) | 0 |
| Amount of sauce | Some sauce | −1 (less as ref) | −1 | 0 | 0 |
| Thickness of sauce | Some binding but not too thick | 1 (thicker as ref) | 1 | −1 (thinner as ref) | 0 |

| Ingredient (% w/w) | Example 8 Amount [%] | Example 9 Amount [%] | Example 10 Amount [%] | Comp. Example 11 Amount [%] | Comp. Example 12 Amount [%] |
|---|---|---|---|---|---|
| Water | 52 | 51 | 33 | 48 | 48 |
| Salt | 5 | 5 | 5 | 5 | 5 |
| Sugars | 13 | 14 | 24 | 24 | 23 |
| Oil | 10 | 10 | 25 | 10 | 10 |
| Flavoring | 16 | 16 | 9.2 | 9.2 | 8 |
| Starch | 4 [1] | 4 [1] | 3.8 [1] | 2 [1] | 6 [1] |
| Maltodextrin | — | — | — | 1.8 | — |

-continued

|  | | | | | |
|---|---|---|---|---|---|
| Viscosity | 49.16 ± 3.80 | 11.31 ± 2.19 | 37.64 ± 0.83 | 5.51 ± 0.39 | 77.04 ± 9.64 |
| Aw | 0.901 | 0.896 | 0.834 | 0.881 | 0.902 |
| pH | 3.92 | 3.95 | 3.76 | 3.8 | 3.77 |
| Melting | −1 | 1 | −1 | 1 | −2 |
| Splattering | 0 | 0 | 0 | 2 | 0 |
| Film formation | 0 | 0 | 0 | 0 | 2 |
| Glazing of meat |  |  |  | 0 | −2 |
| Smoking/burning | 1 | 1 | 1 | 1 | 2 |
| Coating of final dish | na | na | na | −1 | 0 |
| Amount of sauce | na | na | na | 0 | −2 |
| Thickness of sauce | na | na | na | −2 | 2 |

| Ingredient (% w/w) | Comp. Example 13 Amount [%] | Comp. Example 14 Amount [%] | Comp. Example 15 Amount [%] | Comp. Example 16 Amount [%] | Comp. Example 17 Amount [%] |
|---|---|---|---|---|---|
| Water | 48 | 48 | 48 | 48 | 48 |
| Salt | 5 | 5 | 5 | 5 | 5 |
| Sugars | 24 | 24 | 24 | 24 | 24 |
| Oil | 10 | 10 | 10 | 10 | 10 |
| Flavoring | 9.2 | 9.2 | 9.2 | 9.2 | 9.2 |
| Starch | 3.8 [6] | 3.8 [7] | 3.8 [8] | 3.8 [9] | 3.8 [10] |
| Viscosity | 1.61 ± 0.05 | 5.31 ± 0.42 | 4.99 ± 0.04 | 3.65 ± 0.02 | 2.39 ± 0.28 |
| Aw | 0.883 | 0.884 | 0.886 | 0.889 | 0.888 |
| pH | 3.8 | 3.79 | 3.79 | 3.79 | 3.81 |
| Melting | 2 | 2 | 1 | 0 | 2 |
| Splattering | 3 | 0 | 0 | 0 | 0 |
| Film formation | 0 | 2 | 2 | 3 | 2 |
| Glazing of meat | 1 | −2 | 0 | 0 | −1 |
| Smoking/burning | 0 | 0 | 1 | na | 1 |
| Coating of final dish | −1 | −1 | 0 | na | 0 |
| Amount of sauce | 0 | 2 | 0 | na | 0 |
| Thickness of sauce | −1 | 1 | 1 | na | 1 |

| Ingredient (% w/w) | Comp. Example 18 Amount [%] | Comp. Example 19 Amount [%] | Comp. Example 20 Amount [%] | Comp. Example 21 Amount [%] |
|---|---|---|---|---|
| Water | 48 | 25 | 33 | — |
| Salt | 5 | 5 | 5 | — |
| Sugars | 24 | 24 | 24 | — |
| Oil | 10 | 33 | 25 | 100 |
| Flavoring | 9.2 | 9.2 | 9.2 | — |
| Starch | 3.8 [11] | 3.8 [1] | 3.8 [9] | — |
| Viscosity | 5.22 ± 0.61 | 66.27 ± 0.97 | 2.62 ± 0.03 | na |
| Aw | 0.885 | 0.780 | 0.834 | na |
| pH | 3.81 | 3.78 | 3.76 | na |
| Melting | 1 | 0 | 2 | 0 |
| Splattering | 0 | 0 | 0 | 2 |
| Film formation | 2 | 1 | 0 | 1 |
| Glazing of meat | 0 | na | na | −2 |
| Smoking/burning | 1 | 2 | 2 | 1 |
| Coating of final dish | −2 | na | na | −2 |
| Amount of sauce | 0 | na | na | na |
| Thickness of sauce | 1 | na | na | na |

[1] Physically modified corn starch (Novation 2300)
[2] Physically modified tapioca starch (Novation 3300)
[3] Chemically modified waxy corn starch (ColFlo 67 Vbl)
[4] Physically modified waxy corn starch (Claria Plus)
[5] Chemically modified waxy corn starch (CTex 06209 INS1422)
[6] Chemically modified tapioca starch (National 104 Ingredion)
[7] Potato starch
[8] Rice starch
[9] Corn starch
[10] Waxy corn (ingredion Amioca TF)
[11] Tapioca starch Example 3 is the reference example for all other tested examples 4-20. In case one of the examples 4-20 has shown a worse melting of the composition in a heated pan of −2 and/or a high splattering of 2 and/or film formation of 2 and/or a glazing of meat of −2 and/or a burning/smoking of 2 it is not desired for the scope of this invention. The performance of the composition in a heated pan is related to the viscosity of the composition. Only modified starches fulfil the performance of good/moderate melting, no/moderate splattering, no/moderate film formation, good glazing of meat and/or no/moderate burning/smoking in a viscosity range of 8 to 60 Pa·s at a shear rate of 1 s$^{-1}$ at 25° C.

Example 3-7 are using different modified starches. Example 8-9 are two different recipes as can be shown on the viscosity using a low amount of sugar. Example 10 is a recipe with an amount of oil of 25 wt %. Examples 11-20 are comparison examples. Example 11 shows a recipe with an amount of starch of 2 wt %. Example 12 shows a recipe with an amount of starch of 6 wt %. Examples 13-18 are using different starches. Examples 19-20 show comparison examples using high amounts of oil. Example 21 describes a traditional method of preparation using only oil for frying the meat and vegetables. In addition to the oil splattering the final prepared meat was very dry compared to all examples 3-10.

The invention claimed is:

1. A shelf-stable cooking aid for coating and frying a food product, the cooking aid comprising:
   oil in an amount of 2-28% (by weight of the total composition);
   water in an amount of 20-60% (by weight of the total composition);
   modified starch in an amount of 2.3-5.5% (by weight of the total composition);
   salt in an amount of 3-15% (by weight of the total composition);
   sugar in an amount of 3-28% (by weight of the total composition);
   flavourings in an amount of 0.5-30% (by weight of the total composition); and
   wherein the cooking aid has a viscosity in the range of 8 to 60 Pa·s at a shear rate of 1s$^{-1}$ at 25° C., and the oil and the water are in form of an emulsion.

2. The cooking aid according to claim 1, wherein the modified starch is modified by a process selected from the group consisting of chemically and physically modified.

3. The cooking aid according to claim 1, wherein the modified starch is a physically modified starch.

4. The cooking aid according to claim 1, wherein the modified starch is in gelatinized form.

5. The cooking aid according to claim 1, wherein the cooking aid has a viscosity in the range of 8 to 50 Pa·s at a shear rate of 1s$^1$ at 25° C.

6. The cooking aid according to claim 1, wherein the cooking aid comprises the oil in an amount of 3-18%, the water in an amount of 40-58%, the modified starch in an amount of 3-5%, the salt in an amount of 3-9%, the sugar in an amount of 6-20% and the flavourings in an amount of 5-25% (by weight of the total composition).

7. The cooking aid according to claim 1, wherein the oil is a vegetable oil.

8. The cooking aid according to claim 1, wherein the cooking aid does not include any additional emulsifier, non-starch polysaccharides, or combinations thereof.

9. A process for making a shelf-stable cooking aid comprising oil in an amount of 2-28% (by weight of the total composition); water in an amount of 20-60% (by weight of the total composition); modified starch in an amount of 2.3-5.5% (by weight of the total composition); salt in an amount of 3-15% (by weight of the total composition); sugar in an amount of 3-28% (by weight of the total composition); flavourings in an amount of 0.5-30% (by weight of the total composition); and wherein the cooking aid has a viscosity in the range of 8 to 60 Pa·s at a shear rate of 1s$^{-1}$ at 25° C., and the oil and water are in form of an emulsion, comprising the steps of:
   mixing ingredients which are not heat sensitive and/or need a pasteurization step at a mixing speed in a range of 1500-2500 rpm to form a mix in a form of an emulsion;
   heating the mix to a temperature of between 70-98° C.;
   pasteurizing the mix at a temperature of at least 72° C. at a mixing speed in the range of 100-200 rpm to form the cooking aid; and
   filling the resulting cooking aid into packaging containers;
   and wherein the cooking aid has a viscosity in the range of 8 to 60 Pa·s at a shear rate of 1s$^{-1}$ at 25° C. and the oil and the water are in form of an emulsion.

10. The process according to claim 9, wherein further ingredients selected from the group consisting of organic acids are added to the ingredients in the mixing.

11. A method for coating and frying a food product in one single manipulation step, wherein the food product is brought into contact with and heated together with a cooking aid comprising oil in an amount of 2-28% (by weight of the total composition); water in an amount of 20-60% (by weight of the total composition); modified starch in an amount of 2.3-5.5% (by weight of the total composition); salt in an amount of 3-15% (by weight of the total composition); sugar in an amount of 3-28% (by weight of the total composition); flavourings in an amount of 0.5-30% (by weight of the total composition); and wherein the cooking aid has a viscosity in the range of 8 to 60 Pa·s at a shear rate of 1s$^{-1}$ at 25° C., and the oil and the water are in form of an emulsion in a heated pan or on a heated surface without addition of any further fat or oil.

12. The method according to claim 11, wherein the food product is a meat and/or a vegetable product.

* * * * *